March 14, 1939.　　　R. W. HOAG　　　2,150,443
FOLDING BOX
Filed Jan. 15, 1937　　　3 Sheets-Sheet 1
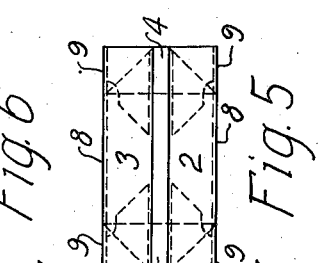
Fig. 7
Fig. 6
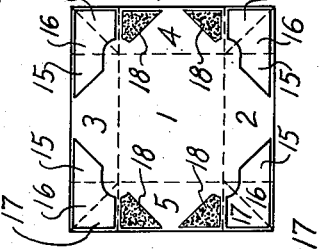
Fig. 5
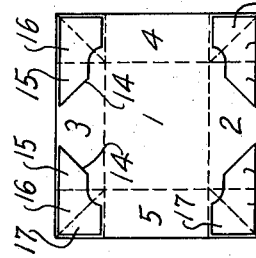
Fig. 4
Fig. 3
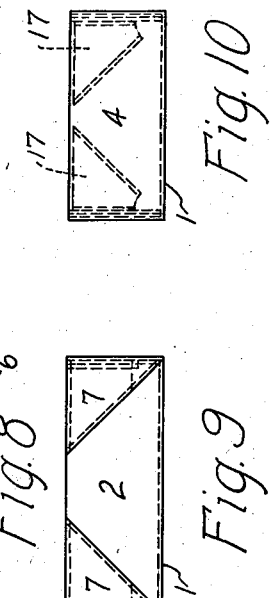
Fig. 10
Fig. 2
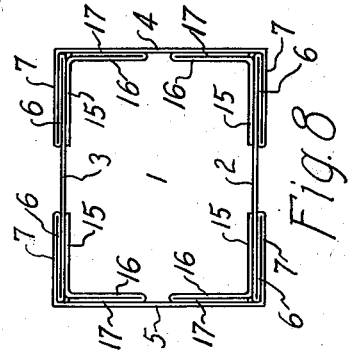
Fig. 8　　Fig. 9
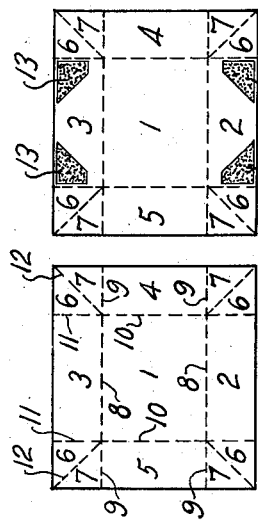
Fig. 1
Inventor,
Roderick Wm Hoag.

March 14, 1939. R. W. HOAG 2,150,443
FOLDING BOX
Filed Jan. 15, 1937 3 Sheets-Sheet 2
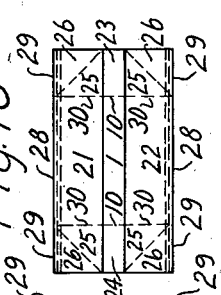
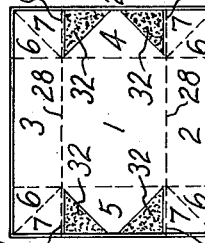
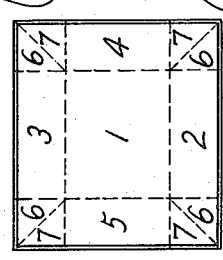
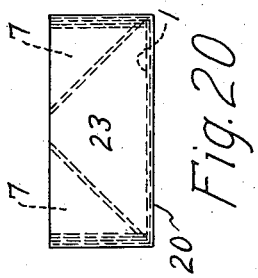
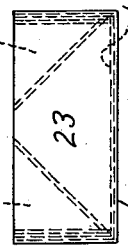
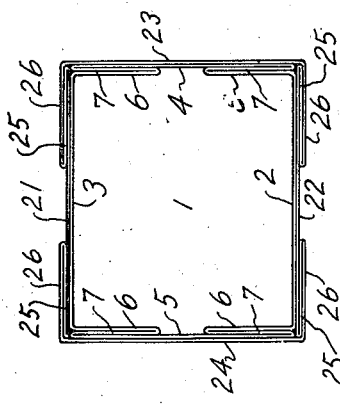
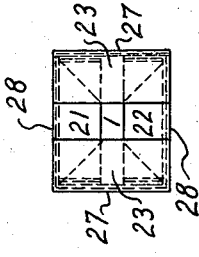
Inventor,
Roderick Wm Hoag.

March 14, 1939.  R. W. HOAG  2,150,443
FOLDING BOX
Filed Jan. 15, 1937  3 Sheets—Sheet 3
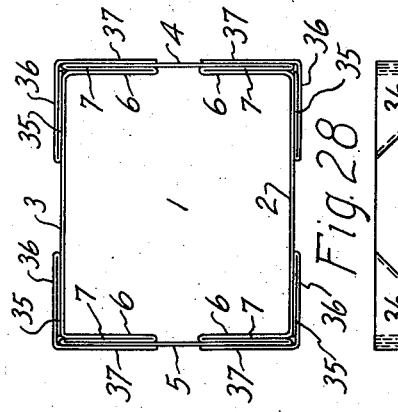
Inventor,
Roderick W<sup>m</sup> Hoag Patented Mar. 14, 1939

2,150,443

UNITED STATES PATENT OFFICE 2,150,443

FOLDING BOX

Roderick W. Hoag, Melrose, Mass.

Application January 15, 1937, Serial No. 120,745

6 Claims. (Cl. 229—31)

The invention relates to improvements in folding boxes of the type which automatically lock the walls thereof in upright position upon being brought to such position.

One object of this invention is to provide a self-locking folding box having re-inforced corners.

The method herein described discloses how a box of the character described may be formed in collapsed condition from a scored blank together with locking elements by adhesively securing said locking elements to wall sections of the blank and applying adhesive to predetermined areas and then performing simple folding operations.

Folding boxes of the type to which this present invention pertains are known, to a limited extent, to persons learned in this art. The present invention however, is the result of an endeavor to produce a box of this type having stronger corners than the boxes heretofore produced.

With said objects in view, and others hereinafter explained my invention consists in the folding box, substantially as hereinafter described and claimed.

Of the accompanying drawings:

Figure 1 is a plan view of the blank from which the box may be formed.

Figure 2 is a plan view of the blank showing areas to which adhesive may be applied in the method of securing the locking elements to the wall sections of the blank.

Figure 3 is a plan view of the blank showing the locking elements in place.

Figure 4 is a plan view of the blank showing areas to which adhesive may be applied for securing the ends of the locking elements to the end wall sections.

Figure 5 is a plan view of the blank showing the condition thereof after the front and rear margins of the blank have been folded against center areas of the blank.

Figure 6 is similar to Figure 5 except that areas are shown to which adhesive may be applied for securing corner segments to the side walls of the box.

Figure 7 is a plan view of the completed box in flat-folded condition.

Figure 8 is an enlarged plan view of the box in set-up form.

Figure 9 is a front elevation of the box shown in Figure 8.

Figure 10 is an end elevation of the box shown in Figure 9.

Figures 11 to 20 inclusive illustrate a modified form of my invention wherein the box blank is covered with a facing paper over the entire outside surface, said facing paper serving as the wall locking medium.

Figure 11 is a plan view of the cover material showing areas to which adhesive may be applied for securing said cover material to the box blank.

Figure 12 is a plan view of the box blank showing scored lines thereon.

Figure 13 is a plan view of the box blank shown in Figure 12 superposed upon the cover material shown in Figure 11, thus said blank and cover material are secured together at the adhesive treated areas shown on the cover material (Fig. 11).

Figure 14 is a plan view of the assembled blank and cover material showing areas to which adhesive may be applied for securing corner segments to the side walls of the box.

Figure 15 is a plan view of the blank assembly showing the condition thereof after the front and rear margins have been folded against center areas of the blank.

Figure 16 is similar to Figure 15 except that areas are shown to which adhesive may be applied for securing corner sections of the cover material of the box to the adjacent side walls thereof.

Figure 17 is a plan view of the completed box in flat-folded condition.

Figure 18 is an enlarged plan view of the box in set-up form.

Figure 19 is a front elevation of the box shown in Figure 18.

Figure 20 is an end elevation of the box shown in Figure 19.

Figures 21 to 30 inclusive illustrate another modified form of my invention. This box is very similar to the embodiment shown in Figures 11 to 20 inclusive except that the former box has a cover material only at the corners thereof.

Figure 21 shows a plan view of the four adhesively treated sections of material which serve the double purpose of corner covering and wall locking elements.

Figure 22 is a plan view of the box blank showing scored lines thereon which effect a division of the blank into sections.

Figure 23 is a plan view of the box blank shown in Figure 22 superposed upon the four adhesively treated wall locking elements shown in Figure 21, thus the said box blank and the said four wall locking elements are secured together at the adhesively treated areas thereof.

Figure 24 is a plan view of the assembly illustrated in Figure 23, showing areas to which adhesive may be applied for securing corner segments to the end walls of the box.

Figure 25 is a plan view of the blank assembly showing the condition thereof after the front and rear margins, together with the wall locking elements, have been folded against center areas of the blank.

Figure 26 is similar to Figure 25 except that areas are shown to which adhesive may be applied for securing sections of the wall locking elements to the adjacent end walls of the box.

Figure 27 is a plan view of the completed box in flat folded condition.

Figure 28 is an enlarged plan view of the box in set-up form.

Figure 29 is a front elevation of the box shown in Figure 28.

Figure 30 is an end elevation of the box shown in Figure 29.

Referring to Figure 1, there is illustrated a scored blank of suitable material, such as paper box board, scored lines are represented by dash lines 8 to 12 inclusive. The said scored lines effect a division of the blank to form a bottom section 1 for the box, side wall sections 2 and 3, end wall sections 4 and and 5, corner segments 6 and 7. The said corner segments 6 and 7 in each corner of the blank form a bellows fold element when the box is set-up for use.

In the method of producing the box in collapsed condition from a scored blank (Fig. 1) predetermined areas 13 (Fig. 2) are treated with adhesive, and wall locking elements 14 (Fig. 3) made of suitable material, such as paper box board, are positioned at each corner of the box blank. Each of said wall locking elements 14 is divided by scored lines to form a side wall securing section 15, an end wall securing section 17, and an intermediate section 16. Side wall securing sections 15 of said locking elements 14 are secured to corresponding side walls by means of adhesively treated areas 13 (Fig. 2). Adhesive is then applied to predetermined areas 18 (Fig. 4) of the end walls 4 and 5. The side walls 2 and 3 together with the corner segments 6 and 7 are then folded on scored lines 8 and 9 (Figs. 4 and 5), wall locking elements 14 being secured at one end to the side walls are necessarily carried over upon the center areas of the blank, thus end wall securing sections 17 of wall locking elements 14 are caused to contact the adhesively treated areas 18. Each wall locking element 14 is then secured at one end to a side wall and at its other end to the corresponding end wall. After the above described folding operation has been performed the blank is in the condition illustrated by Figure 5. The upward facing surfaces of the side walls 2 and 3 (Fig. 6) are then adhesively treated at predetermined areas 19. The end wall sections 4 and 5 together with the corner sections 6 and 7 are then folded on lines 10 and 11, thus causing the corner sections 6 to contact the adhesively treated areas 19 to complete the box in collapsed condition as is illustrated by Figure 7.

When it is desired to set-up or erect the box, the side walls 2 and 3 (Fig. 7) are simply raised and bent outward, whereupon each corner section 7 will automatically fold on scored lines 12 against the corresponding corner sections 6, thus forming a bellows fold element at each corner of the box, each of said bellows fold elements extends along and is secured at corner section 6, to the outside of the adjacent side wall of the box. Simultaneous with the folding into position of the corner sections just described, the locking elements 14 at each corner take positions at the inside walls of the box, the end sections 15 of the locking elements 14 being secured to side walls 2 and 3 and the other end sections 17 are secured to the end walls 4 and 5, the intermediate section 16 of the locking element is caused to fold against section 17 thus forming a bellows fold at the inside of the end wall of the box adjacent to each corner. It will be observed that when the box herein described is set-up the walls thereof will be locked in up-right position due to the bellows fold elements at each corner.

Referring to Figures 11 to 20 inclusive, there is illustrated an embodiment of my invention which is preferable when a wrapped box is required. It will be observed that this construction is substantially the same in principle as the box illustrated in Figures 1 to 10 inclusive; both constructions provide one bellows fold secured to a side wall and another bellows fold secured to an end wall at each corner of the set-up box.

In the method of producing the box shown in Figures 11 to 20 inclusive, a sheet of cover material (Fig. 11) is scored to provide a bottom 20, side walls 21 and 22, end walls 23 and 24, and corner sections 25 and 26. Adhesive is applied to predetermined areas 21, 22, 23, and 24. Figure 12 shows a blank of relatively stiff material, scored to provide a bottom 1, side walls 2 and 3, end walls 4 and 5, and corner sections 6 and 7, scored lines are represented by dash lines 8 to 12 inclusive.

The box blank shown in Figure 12 is superposed upon the adhesively treated cover material shown in Figure 11, the assembly is then in the condition illustrated by Figure 13. Adhesive is then applied to areas 32 shown in Figure 14. The side margins of the composite blank are then folded upon center areas of the blank (Fig. 15), thus corner sections 7 of the blank become secured to the end walls by means of adhesively treated areas 32. Adhesive is then applied to areas 33 (Fig. 16), of the upward facing surfaces of the folded side margins 21 and 22. The ends of the folded assembly are then folded on scored lines 10, 11, 27 and 30, thus corner sections 25 of the cover material contact the said adhesively treated areas 33 on the cover material at the side walls 21 and 22, to complete the box in flat-folded condition as is illustrated by Figure 17. Figures 18, 19 and 20 illustrate the box after it has been set-up for use. The box is set-up or erected from the flat-folded condition shown in Figure 17, by simply raising the side walls and bending them outward, whereupon each corner section 6 automatically folds on scored line 12 against the corresponding corner section 7, thus forming a bellows fold element at each corner of the box, each of said bellows fold elements extend along and is secured at corner section 7 to the inside of the adjacent end wall. Simultaneous with the folding into position of the corner sections just described, the corner sections 26 of the cover material, at each corner of the box automatically folds on scored line 31 against the corresponding corner section 25, thus forming a bellows fold element at each corner of the box, each of said bellows fold elements extends along and is secured at corner section 25 to the outside surface of the corresponding side wall. It will be apparent that when the box herein described is set-up the walls thereof, will be locked in upright position due to the bellows fold elements at each corner.

Figures 21 to 30 inclusive illustrate another embodiment of my invention which is similar to that described in Figures 11 to 20 inclusive. The principal difference being that in the construction hereinafter described, a covering material which forms a locking element, is provided at the corners of the box instead of covering the entire outside surface of the box as in the construction previously described. In the method of producing the box shown in Figures 21 to 30 inclusive, four locking elements 34 (Fig. 21) made from any suitable material are each scored to provide an end wall securing section 37, a side wall securing section 35, and an intermediate section 36. Sections 37 of the said locking elements are adhesively treated as is illustrated by Figure 21. Figure 22 illustrates a scored blank of suitable material, such as paper box board, scored lines are represented by dash lines 8 to 12 inclusive. The said scored lines effect a division of the blank to form a bottom section 1 for the box, side walls 2 and 3, end wall sections 4 and 5, corner segments 6 and 7. The said corner segments 6 and 7 at each corner of the blank form a bellows fold element when the box is set-up for use. The blank just described, and shown in Figure 22, is superposed upon the four adhesively treated locking elements 34, shown in Figure 21. Figure 23 shows the locking elements 34 positioned at the underside of the corners of the box blank. The adhesively treated areas 37 thus being secured to the end wall sections 4 and 5, and sections 35 and 36 of each locking element underlying corresponding corner sections 6 and 7 at each corner of the box blank. Adhesive is then applied to upward facing surfaces 40 of the ends walls 4 and 5 as shown in Figure 24. Side margins of the composite blank are folded on scored lines 8 and 9 of the box blank and locking elements 34 are folded on scored lines 39 as shown in Figure 25. The folding just described will cause the corner segments 7 at each corner of the box blank to contact the adhesively treated areas 40 of the end walls 4 and 5. The upward facing surfaces of folded side margins 2 and 3 (Fig. 26) are treated with adhesive at areas 41. The end wall sections 4 and 5 are then folded on scored lines 10 and 11; in so folding the said end wall sections the areas 35 and 36 of the locking elements 34 will contact the folded side walls 2 and 3, sections 35 thus becoming secured to the side walls at adhesively treated areas 41 to complete the box in flat-folded condition as shown in Figure 27.

When it is desired to set-up the box produced by the method just described, the side walls 2 and 3 (Fig. 27) are simply raised and bent outward, whereupon each corner section 6 will automatically fold on scored lines 12 against the corresponding corner section 7, thus forming a bellows fold element at each corner of the box, each of said bellows fold elements extends along and is secured at corner section 6 to the inside of the adjacent end wall of the box. Simultaneous with the folding into position of the corner sections just described, intermediate section 36 of each locking element 34 at each corner of the box, automatically folds on scored lines 38 against the corresponding side wall securing section 35, thus forming a bellows fold element at each outside corner of the box, each of said bellows fold elements extends along and is secured at section 35 to the outside of the adjacent side wall of the box.

It is apparent from Figures 28, 29 and 30, that the two bellows fold elements at each corner of the box serve to retain the walls of the box in upright position upon being brought to such position.

The scored lines 8 and 9 (Figs. 1, 12 and 22) are shown as being in straight lines, as are scored lines 10 and 11. These scored lines are illustrated in this way for simplicity, but in practice it may be desirable, when the blank is made of fairly thick material, to have some of the lines out of line with each other, or at a slight angle with each other, in order to compensate for the thickness of the material from which the box blank is made and to permit folding the walls and corners of the box to flat condition and so that the box may be set-up without binding or cramping.

I have shown in the method of producing the box shown in Figures 11 to 20 inclusive, that corner segments 7, shown in Figure 14, should be secured to the end walls 4 and 5 at areas 32, but it is not necessary that said segments 7 be so secured, because the box will be effective for many uses without having a surface of corner segments 7 fastened to the inside surfaces of the end walls. The same is also true of the embodiment shown in Figures 21 to 30 inclusive. It is not necessary that corner sections 7 (Fig. 24) be secured to end walls 4 and 5 at areas 40 (Fig. 24).

In some instances where a fairly thick blank material is used it will be found advisable to cut through the blank on the lines shown as scored lines 9 in Figures 1, 12 and 22.

The cover material illustrated in Figure 11 is shown as being scored, but in cases where the cover material is very thin and flexible this scoring may be dispensed with.

Having described my invention, what I claim is:

1. A folding paper box comprising a bottom, upright side walls and a pair of end walls, a bellows fold element at each inside corner of the box, one section of each of said bellows fold elements being secured to the inside surface of the corresponding end wall, a flexible covering material secured at predetermined areas to outside surfaces of the box, a bellows fold element at each outside corner of the box being integral with the said covering material, one section of each of the bellows fold elements on the outside of the box being secured to the covering material at the corresponding side wall, substantially as described.

2. A folding paper box comprising a bottom, upright side walls and a pair of end walls, a bellows fold element at each inside corner of the box being integral with the ends of the corresponding end wall and side wall, the said bellows fold elements being positioned against the adjacent end wall, a flexible covering material secured to the outside surfaces of the box, a bellows fold element at each outside corner of the box being integral with the said covering material, one section of each of the bellows fold elements on the outside of the box being secured to the covering material at the corresponding side wall, substantially as described.

3. A folding box comprising a bottom, upright side walls and a pair of end walls, a bellows fold element at each inside corner of the box, one section of each of said bellows fold elements being secured to the inside surface of the corresponding end wall, a flexible covering material of substantially the same dimensions as the blank from which the box is made being secured at predetermined areas to the outside surfaces of the box, a bellows fold element at each outside corner of the box being integral with the said covering material, one section of each of the bellows fold elements on the outside of the box being secured to the covering material at the corresponding side wall, substantially as described.

4. A folding box comprising a bottom, upright side walls and a pair of end walls, a bellows fold element at each inside corner of the box, said bellows fold elements being positioned against the adjacent end wall; a flexible covering material secured to the outside surfaces of the box, a bellows fold element at each outside corner of the box being integral with the said covering material, one section of each of the bellows fold elements on the outside of the box being secured to the covering material at the corresponding side wall, substantially as described.

5. A folding box comprising a bottom, upright side walls and a pair of end walls, a bellows fold element at each outside corner of the box being integral with the ends of the adjacent end wall and side wall, one section of each of said bellows fold elements being contiguous with and secured to the corresponding side wall; a locking element, composed of a side wall securing section and a bellows fold element, being positioned at each inside corner of the box; each side wall securing section being fastened to the side wall adjacent to the corresponding corner of the box and one section of each bellows fold element, which forms part of each locking element, being secured to the inside surface of the corresponding end wall.

6. A folding box made from a plurality of paper blanks, comprising a rectangular shaped bottom, upright side walls and a pair of upright end walls; a bellows fold element adjacent to each outside corner of the box and lying parallel with the corresponding side wall, the fold line of each bellows fold element being at an angle of 45 degrees from the bottom of the box; and a bellows fold element adjacent to each inside corner of the box and lying parallel with the corresponding end wall, the fold line of each bellows fold element being at an angle of 45 degrees from the bottom of the box.

RODERICK WM. HOAG.